United States Patent Office 3,755,456
Patented Aug. 28, 1973

3,755,456
ALDEHYDE SEPARATION PROCESS
Wayne B. Gitchel, Rothschild, Donald G. Diddams, Schofield, and James W. Barr, Rothschild, Wis., assignor to Sterling Drug Inc., New York, N.Y.
No Drawing. Filed Nov. 10, 1970, Ser. No. 88,522
Int. Cl. C07c 45/24
U.S. Cl. 260—600          2 Claims

ABSTRACT OF THE DISCLOSURE

Mixtures of syringic aldehyde and vanillin are separated into the pure components by selective precipitation of the syringic aldehyde-ammonia complex from aqueous methanol, and isolation of syringic aldehyde and vanillin from the acidified complex and filtrate, respectively.

The invention relates to a process for separating syringic aldehyde and vanillin from mixtures thereof obtained from hardwood-derived alkaline lignin liquors.

It is well known to prepare vanillin (3-methoxy-4-hydroxybenzaldehyde) by alkaline treatment and oxidation of lignin derivatives (U.S. Patents 2,104,701, 2,399,607, 2,434,626). High yields of vanillin are obtained from lignin substances derived from softwoods (evergreens; pine, spruce, balsam, etc.). Lignins from hardwood (birch, poplar, maple, oak, etc.), however, afford a relatively high proportion of syringic aldehyde (4-hydroxy-3,5-dimethoxybenzaldehyde) such that the aldehyde fraction comprises approximately equal amounts of syringic aldehyde and vanillin. Such mixtures containing less than 80% of the more abundant component cannot be separated by ordinary means such as fractional distillation or crystallization.

The selective precipitation of syringic aldehyde-ammonia complex by addition of ammonia to an ethanol solution of a syringic aldehyde-vanillin mixture is known [Creighton, McCarthy and Hibbert, J. Am. Chem. Soc. 63, 312 (1941)]. In this way a major proportion of the syringic aldehyde component could be obtained in substantially pure form. However, the process of the reference afforded only a small yield of pure vanillin by precipitation of vanillin-ammonia complex from an ether solution of the residual aldehyde mixture remaining after removal of the majority of the syringic aldehyde component, followed by sublimation of the crude vanillin complex. The yield of pure vanillin was only about 10% that of pure syringic aldehyde.

The present invention constitutes an improvement over the prior art process, whereby substantial yields of both pure syringic aldehyde and pure vanillin are obtained by a simplified procedure which avoids the isolation of vanillin-ammonia complex. It provides a better than 80 percent, and usually better than 90 percent, separation of syringic aldehyde and vanillin so that the two components can readily be obtained in pure form by crystallization.

The process of the invention comprises:

(a) Dissolving the aldehyde mixture in 70–85% aqueous methanol at a concentration of 50–300 grams per liter;

(b) Adding a saturated solution of ammonia in water or aqueous methanol, or gaseous anhydrous ammonia, until the molar ratio of ammonia to syringic aldehyde is between 1:1 and 4:1, (c) Separating the aldehyde-ammonia complex from the mixture;

(d) Adding aqueous acid to a slurry of the aldehyde-ammonia complex in water or aqueous methanol to decompose the complex and neutralize the ammonia;

(e) Adjusting the acidified mixture to a concentration of 20–40 grams of aldehyde per liter in water or 40–225 grams of aldehyde per liter in aqueous methanol, and allowing the substantially pure syringic aldehyde to crystalline therefrom;

(f) Treating the filtrate from the aldehyde-ammonia complex with dilute acid to about pH 3;

(g) Concentrating the acidified solution, adjusting it to a concentration of 20–40 grams of aldehyde per liter in water or 40–400 grams of aldehyde per liter in aqueous methanol, and allowing the substantially pure vanillin to separate therefrom;

(h) Recovering residual aldehyde mixture from the mother liquors and recycling it to the ammonia treatment step.

Throughout this specification, percent aqueous methanol means percent by volume of methanol in water.

In Step (b) a preferred molar ratio of ammonia to syringic aldehyde is about 1.87:1.

In Steps (d) and (f), any strong inorganic acid can be used, although sulfuric acid is preferred in view of the relatively high solubility of ammonium sulfate in water or aqueous methanol.

In Step (f) it is preferable to carry out the acidification as soon as possible after removal of the syringic aldehyde crystals in order to obtain optimum yields of vanillin.

In Steps (e) and (g) the preferred concentration of the aldehyde in aqueous methanol increases with increasing concentrations of methanol, ranging from about 40 grams per liter at 0 percent methanol to the maximum concentration in 50 percent methanol.

In step (g) the vanillin separates either as oil or crystals. The oil is readily crystallized from water or aqueous methanol. Although the vanillin obtained by the process of the invention is at least 99.5% purity it contains a tan color which can be removed by distillation and recrystallization.

In step (h) the mother liquors derived from Steps (e) and (g) are adjusted to about pH 3, distilled to remove the methanol and extracted with butyl alcohol, or other appropriate solvent, such as amyl alcohol, chlorinated hydrocarbons, or the like. The butyl alcohol is then removed by distillation and the recovered aldehyde mixture recycled to Step (a) of the process.

The following example will illustrate the invention without the latter being limited thereby.

EXAMPLE

An aldehyde mixture was obtained by conventional means as follows. A hardwood concentrate was treated with sodium hydroxide and heated with oxygen in the presence of manganese dioxide catalyst. The oxidized liquor was extracted with butyl alcohol and the extracts concentrated to a small fraction of the original volume by distillation at reduced pressure. The residual solution was made acid with sulfur dioxide and extracted repeatedly with sodium bisulfite solution. The bisulfite extracts were acidified with 50% aqueous sulfuric acid and extracted with ethylene dichloride. Evaporation of the ethylene dichloride gave a residue assayed by gas chromatography as follows:

| | Percent |
|---|---|
| Vanillin | 43.1 |
| Syringic aldehyde | 45.8 |
| p-Hydroxybenzaldehyde | 0.04 |
| 5-Formylvanillin | 0.02 |
| 3-Methoxy-4-hydroxyacetophenone | 3.56 |
| 4-Hydroxy-3,5-dimethoxyacetophenone | 6.00 |
| Unknown | 1.48 |

The foregoing mixture was distilled at about 175° C. (1–2 mm.), and 1.166 kg. of the distilled mixture was dissolved in 6.485 liters of 90% aqueous methanol. A solution of 0.087 kg. of ammonia in 0.35 liter of 90% aqueous methanol was added over a period of ninety minutes. The mixture was allowed to stand for thirty minutes and then was centrifuged without washing. The wet cake of aldehyde-ammonia complex was suspended in 1.845 liters of 30% methanol and treated with 50% aqueous sulfuric acid until the mixture had pH 3.0. The mixture was agitated and cooled in a running water bath to 11° C., and the crystalline product was collected by centrifugation, washed with water (about 2 liters per kg. of product), and dried to give 0.419 kg. of syringic aldehyde, M.P. 110–115° C., of about 99.0–99.9% purity. A recrystallization from 30% methanol gave a sample of syringic aldehyde having M.P. 114–115° C.

The liquor obtained from the centrifugation of the aldehyde-ammonia complex without delay was treated with 50% aqueous sulfuric acid until the mixture had pH 3. The mixture was then distilled to remove methanol until the concentration of methanol in the mixture was about 45% and the concentration of organic material about 300 grams per liter. Crystallization occurred and the product was collected to give 0.447 kg. of vanillin, M.P. 80–82° C. The vanillin thus obtained was essentially free of impurities (99.5–100%), but contained a tan color which was removed by distilling it under vacuum and recrystallizing it to obtain a sample of vanillin of M.P. 81–83° C.

The acidic mother liquors from the crystallization of the syringic aldehyde and vanillin were combined, adjusted to pH 3 and distilled to remove most of the methanol. The residual mixture was extracted with butyl alcohol and the recovered aldehyde mixture obtained thereby reprocessed according to the foregoing procedure.

In the foregoing procedure the molar ratio of ammonia to syringic aldehyde component was 1.87:1. Similar results were obtained with ratios of 3.15:1, 2.77:1 and 1.24:1.

What is claimed is:

1. The process for separating syringic aldehyde and vanillin from mixtures thereof obtained from hardwood-derived alkaline lignin liquors which comprises:

(a) dissolving the aldehyde mixture in 70–95% aqueous methanol at a concentration of 50–300 grams per liter;

(b) adding a saturated solution of ammonia in water or aqueous methanol, or gaseous anhydrous ammonia to the solution of Step (a), until the molar ratio of ammonia to syringic aldehyde is between 1:1 and 4:1;

(c) separating the aldehyde-ammonia solid complex which forms from the mixture of Step (b);

(d) adding aqueous acid to a slurry of the said solid aldehyde-ammonia complex separated in Step (c) in water or aqueous methanol to decompose the complex, neutralize the ammonia and form a solution;

(e) adjusting the acidified solution obtained in Step (d) to a concentration of 40–225 grams of aldehyde per liter in aqueous methanol, the amount of methanol ranging up to 50%, proportional to the concentration of aldehyde, and crystallizing and separating substantially pure syringic aldehyde therefrom;

(f) treating the liquor from Step (c) which dilute acid to about pH 3;

(g) concentrating the acidified solution from Step (f), adjusting it to a concentration of 40–400 grams of aldehyde per liter in aqueous methanol, the amount of methanol ranging up to 50%, proportional to the concentration of aldehyde, and crystallizing and separating substantially pure vanillin therefrom;

(h) recovering residual aldehyde mixture from the mother liquors obtained in Steps (e) and (g) and recycling it to the ammonia treatment step.

2. The process according to claim 1 in which the molar ratio of ammonia to syringic aldehyde is about 1.87:1.

References Cited

UNITED STATES PATENTS

| | | | |
|---|---|---|---|
| 2,433,327 | 12/1947 | Lewis et al. | 260—600 X |
| 2,489,200 | 11/1949 | Sankey et al. | 260—600 |
| 2,516,412 | 7/1950 | Pearl | 260—600 |
| 3,049,566 | 8/1962 | Schoeffel | 260—600 |

OTHER REFERENCES

Creighton et al., J.A.C.S., vol. 63 (1941), p. 312.

BERNARD HELFIN, Primary Examiner